United States Patent
Chen et al.

(10) Patent No.: US 10,417,426 B2
(45) Date of Patent: Sep. 17, 2019

(54) AGGREGATING SERVICE DATA FOR TRANSMISSION AND RISK ANALYSIS

(71) Applicant: Alibaba Group Holding Limited, George Town (KY)

(72) Inventors: Lujia Chen, Shanghai (CN); Qingyue Zhou, Hangzhou (CN); Weiqiang Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 15/691,098

(22) Filed: Aug. 30, 2017

(65) Prior Publication Data

US 2018/0060587 A1     Mar. 1, 2018

(30) Foreign Application Priority Data

Aug. 31, 2016  (CN) .......................... 2016 1 0796941

(51) Int. Cl.
*G06F 21/57*     (2013.01)

(52) U.S. Cl.
CPC ........ *G06F 21/57* (2013.01); *G06F 2221/034* (2013.01)

(58) Field of Classification Search
None
See application file for complete search history.

(56) References Cited

U.S. PATENT DOCUMENTS

| 7,571,138 | B2 | 8/2009 | Miri et al. |
| 8,595,194 | B2 | 11/2013 | Cormode et al. |
| 2002/0178046 | A1 | 11/2002 | Lawrence |
| 2010/0011225 | A1* | 1/2010 | Takayama ............... G06F 21/57 713/189 |
| 2011/0066600 | A1 | 3/2011 | Cormode et al. |

(Continued)

OTHER PUBLICATIONS

International Search Report and Written Opinion of the International Searching Authority issued in International Application No. PCT/US2017/049654 dated Nov. 2, 2017; 7 pages.

(Continued)

*Primary Examiner* — Christopher A Revak
(74) *Attorney, Agent, or Firm* — Fish & Richardson P.C.

(57) ABSTRACT

Methods, systems, and computer-readable storage media for risk identification of service data using operations of determining, by a client-side computing device, a first service data corresponding to a first operation behavior associated with a user input on the client-side computing device, determining, by the client-side computing device, a first variable corresponding to the first service data, the first variable including a first eigenvalue, retrieving, by the client-side computing device, a second eigenvalue corresponding to a second operation behavior that was performed at a second time before the first operation behavior, generating, by the client-side computing device, a decay value by processing the first time and the second time a decay function, generating, by the client-side computing device, an aggregated data by processing the first variable, the second eigenvalue, and the decay value using an aggregation function, and determining, by the one or more processors, a risk associated with the first operation by processing the aggregated data using a risk identification model.

20 Claims, 4 Drawing Sheets

(56) References Cited

U.S. PATENT DOCUMENTS

2013/0311872 A1    11/2013  Jokl, III et al.
2014/0358895 A1    12/2014  Liu et al.
2015/0026027 A1     1/2015  Priess et al.
2015/0373039 A1    12/2015  Wang
2016/0078112 A1     3/2016  Eickelman et al.
2016/0127401 A1     5/2016  Chauhan et al.
2016/0373472 A1*   12/2016  Pieczul ................. G06F 21/552
2017/0104778 A1*    4/2017  Shabtai ................. G06F 21/552
2017/0337374 A1*   11/2017  Chen .................... G06F 21/561

OTHER PUBLICATIONS

International Preliminary Report on Patentability in International Application No. PCT/US2017/049654, dated Mar. 5, 2019, 5 pages.
European Extended Search Report in European Patent Application No. 17847563.8, dated Jul. 26, 2019, 8 pages.

* cited by examiner

AGGREGATING SERVICE DATA FOR TRANSMISSION AND RISK ANALYSIS

CROSS REFERENCE TO RELATED APPLICATIONS

This application claims priority to Chinese Application No. 201610796941.X, filed on Aug. 31, 2016, the entire contents of which are hereby incorporated by reference.

BACKGROUND

Risk identification is useful in several contexts. As an example, service data can improve the balance between device security and data access. This task relies on computing accurate risk scores for acquired service data. The increasing number of new types of data and the increasing accessibility to different data sources provide additional challenges to risk identification. A common technical issue associated with risk identification is that time streams of service data are requested and received through multiple calls between systems. For example, a number of calls can be proportional to an amount of service data, such that an increase in the amount of service data prolongs processing time associated with a risk identification, and otherwise inefficiently consumes computing resources.

SUMMARY

Implementations of the present disclosure include computer-implemented methods for transferring service data for risk identification. In some implementations, actions include determining, by a client-side computing device, a first service data corresponding to a first operation behavior associated with a user input on the client-side computing device, determining, by the client-side computing device, a first variable corresponding to the first service data, the first variable including a first eigenvalue, retrieving, by the client-side computing device, a second eigenvalue corresponding to a second operation behavior that was performed at a second time before the first operation behavior, generating, by the client-side computing device, a decay value by processing the first time and the second time a decay function, generating, by the client-side computing device, an aggregated data by processing the first variable, the second eigenvalue, and the decay value using an aggregation function, and determining, by the one or more processors, a risk associated with the first operation by processing the aggregated data using a risk identification model.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

These and other implementations can each optionally include one or more of the following features: in response to generating the aggregated data, deleting the second eigenvalue; the one or more processors can be integrated in a server-side computing device; the operations can further include transmitting the aggregated data from the client-side computing device to the server-side computing device; the aggregation function can include a mathematical operation defining at least one of a summing operation, an identification of a maximum value, and an identification of non-repetitive results; the decay function can include a mathematical operation defining at least one of an exponential function, a logarithmic function, a trigonometric function, a moving window type function, and a polynomial type function; the operations can further include displaying the risk associated with the first operation to a user of the client-side computing device.

The subject matter described in this specification can be implemented in particular implementations, so as to realize one or more of the following advantages. First, service data (for example, time streams) collection and processing is designed for efficiency to minimize impact on the network and client device resources. Second, transmission time is optimized by minimizing a number of calls between the client device and the server system, independent of the number of requested time streams from the server system. Third, processing time is optimized by performing a plurality of processing operations at server system, which is typically configured with greater processing capabilities (for example, faster/more efficient processor or greater amount of system/storage memory) than the client device. Fourth, the components of the example architecture have been configured to enable the transmission of multiple service data within a single message that is sent over the bus from the front-end server to the back-end server, perform at least a part of data processing (for example, risk identification) at the back-end server and receive a single response (for example, risk score). Fifth, an advantage of iterative computing of the decay function, is that not all calculated data can be permanently stored, so that storage overhead and computing overhead of the client does not change with the magnitude of data, which can greatly enhance storage, transmission, and computing capabilities of the client. The risk identification rule can use as input only the aggregated data, providing the advantage of reducing the consumption of computing resources. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
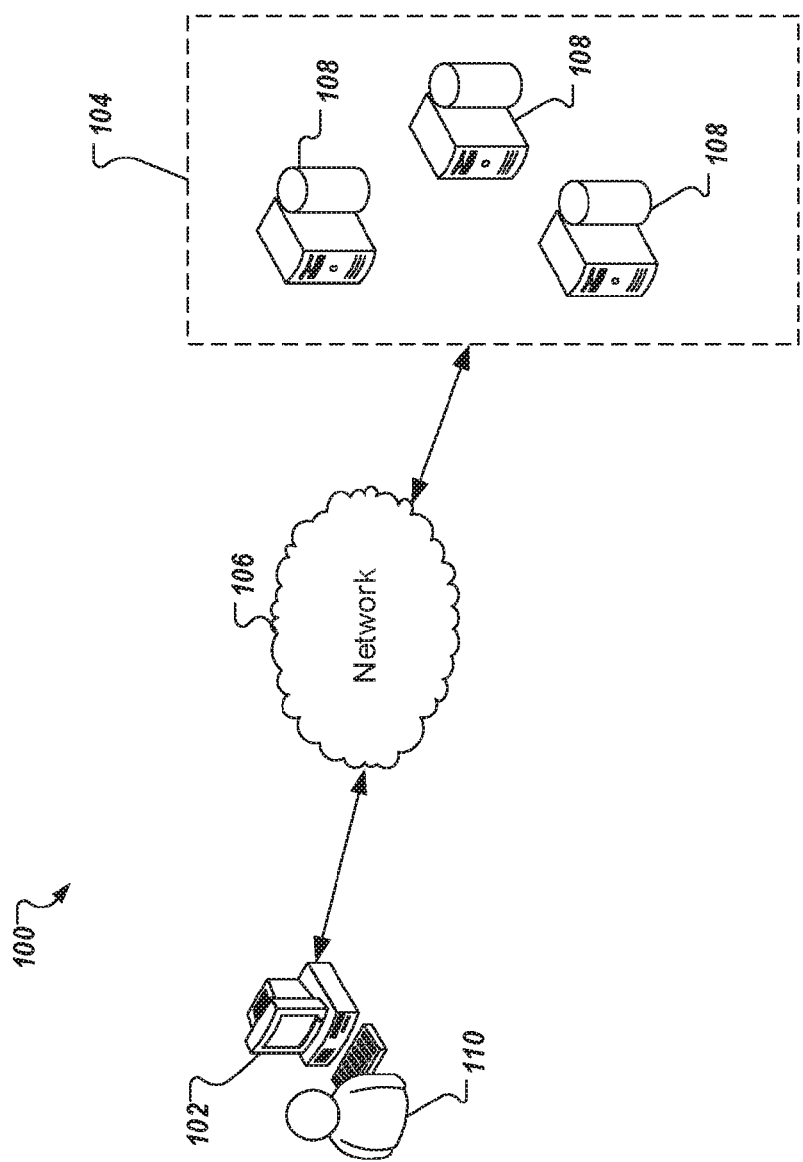
FIG. 1 depicts an example architecture that can be used to execute implementations of the present disclosure.

Implementations of the present disclosure are generally directed to data transfer for a risk identification model to determine the risk of service data, the risk identification model providing a definition of service parameters for service data. More particularly, implementations of the present disclosure are directed to transferring aggregated service data for reducing the time associated with transmission of data from a client-side proxy to a server-side computing device, and otherwise provide a more efficient use of computing resources than other techniques.

Implementations can include actions of receiving, by a client-side computing device, a user input comprising a first operation behavior performed at a first time, determining, by the client-side computing device, a first service data corresponding to the first operation behavior, determining, by the client-side computing device, first variables corresponding to the first service data, each of the first variables comprising a first eigenvalue, retrieving, by the client-side computing device, a second eigenvalue corresponding to a second operation behavior that was performed at a second time before the first operation behavior, generating, by the client-side computing device, a decay value by processing the first time and the second time a decay function, generating, by the client-side computing device, an aggregated data by processing the first variables, the second eigenvalue, and the decay value using an aggregation function, and determining, by one or more processors, a risk associated with the first operation by processing the aggregated data using a risk identification model. Risk identification models can utilize time streams of service data in order to determine risk of service data. Given that a time stream can change constantly, and can include large historical bases, transmission of time streams from a client-side proxy to a server-side computing device can be a resource-intensive process. As described in further detail herein, implementations of the present disclosure address this challenge. For example, in accordance with implementations of the present disclosure, in order to reduce the resource demand to transmit service data from a client-side proxy to a server-side computing device, the service data can be aggregated before transmission and the risk identification model can be configured to process the aggregated data.

The following detailed description is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with a software application (or "application") that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the client device 102 includes a data store that stores service data. In some implementations, the client device 102 hosts an analytical web application that a customer can access (for example, using a thin client on a web browser executed by the computing device 102). In some implementations, the analytical web application processes the service data (for example, time streams of service data) received from a database or a webpage, or a combination of database and webpage, processes the service data, and aggregates the service data into a smaller size data, before sending the aggregated service data to the server system 104 over the network 106.

In some implementations, the network 106 can include a large computer network, such as a local area network (LAN), a wide area network (WAN), the Internet, a cellular network, a telephone network (for example, PSTN), or an appropriate combination thereof, connecting any number of communication devices, mobile computing devices, fixed computing devices and server systems.

In some implementations, each server device 108 includes at least one server and at least one data store that stores service data. In some implementations, and as described herein, the server system 104 can be provided by a third-party service provider, which stores and provides access to service data. In the example depicted in FIG. 1, the server devices 108 are intended to represent various forms of servers including, but not limited to, a web server, an application server, a proxy server, a network server, or a server pool. In general, server systems accept requests for application services and provides such services to any number of client devices (for example, the client device 102) over the network 106.

In accordance with implementations of the present disclosure, the server system 104 can host a risk identification service (for example, provided as one or more computer-executable programs executed by one or more computing devices). For example, input data including multiple service data or aggregated service data can be provided to the server system (for example, from the client device 102), and the server system 104 can process the input data through the risk identification service to provide result data. For example, the server system 104 can send the result data to the client device 102 over the network 106 for display to the user 110.

As discussed in further detail herein, implementations of the present disclosure achieve one or more advantages. Service data (for example, time streams) collection and processing is designed for efficiency to minimize impact on the network and client device resources. In particular, implementations of the present disclosure optimize data transmission time. The transmission time is optimized by minimizing a number of calls between the client device 102 and the server system 104, independent of the number of requested time streams from the server system 104. Implementations of the present disclosure optimize data processing time and minimize processing requirements of the client device 102. The processing time is optimized by performing a plurality of processing operations at server system 104, which is typically configured with greater processing capabilities (for example, faster/more efficient processor or greater amount of system/storage memory) than the client device 102.

In some implementations, only the client device 102 is modified to integrate implementations of the present disclosure, including aggregation of time streams. For example, the application driver, such as a standard component of the client device 102 can be replaced with a corresponding configuration that can perform the operations described with reference to FIG. 3. The database, including associated search algorithms used to retrieve the service data, is not modified.

As described in further detail herein, implementations of the present disclosure function largely independently of the browser, and do not require any modification to the browser (for example, no browser extensions or plug-ins). Further, implementations of the present disclosure support more operations than a simple search, such as filtering, resampling, aggregations, and risk identification, which are typical operations used in analytical applications. Implementations of the present disclosure also provides the backend system with aggregated streams at a single point in time in order to calculate a risk associated with an operation behavior, rather than performing single calls for each time stream of service data.

Figure 2:
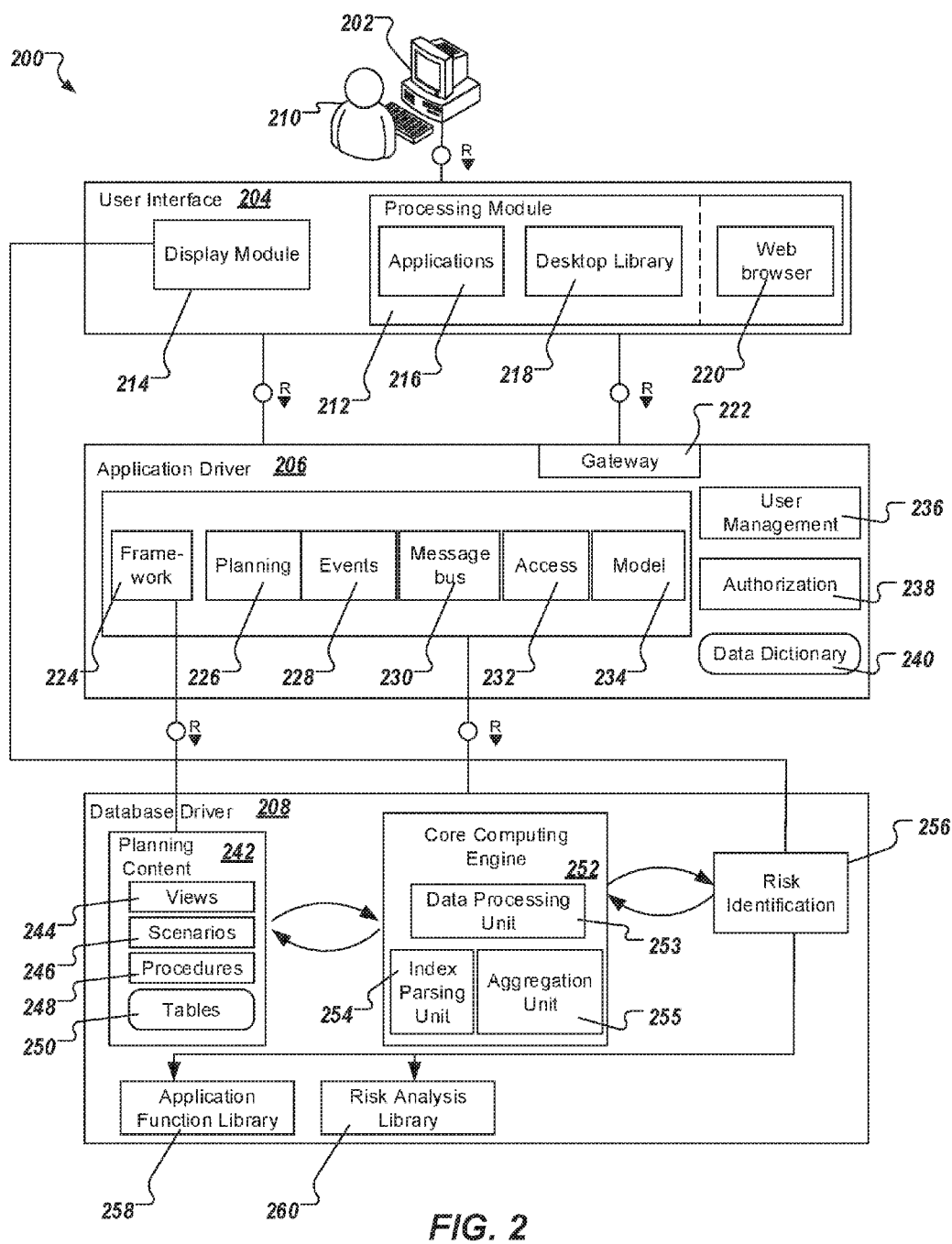
FIG. 2 depicts an example component architecture in accordance with implementations of the present disclosure.

FIG. 2 depicts an example component architecture 200 in accordance with implementations of the present disclosure. In some implementations, components of the example architecture 200 include a client device 202 (for example, a client device 102), a user interface 204, an application driver 206, and a database driver 208. In particular instances, the user interface 204, the application driver 206 and the database driver 208 can be included in different servers. For example, the user interface 204 can be provided on a client-side application server. In some implementations, the user interface 204 can be provided across multiple client-side application servers. The application driver 206 and the database driver 208 can be included either in the client-side or a server-side back-end.

The client device 202 can include a client-side computing device or a user that uses the client-side computing device. The client device 202 can be configured to receive a user input from a user 210 through the user interface 204. In the depicted example, the user interface 204 includes a processing module 212 and a display module 214. The processing module 212 can include an application module 216, a desktop library 218, and a browser 220. The processing module 212 can enable a user 210 to select an application (for example, a web-browsing application including service data) and provide user input within the application, which is processed based on pre-set variable to determine service data.

An application installed on a client device 202 can include a plurality of pages, and the user 210 can access any of the plurality of pages. For example, the user 210 selects (such as, clicks, touches, or swipes) an operation based on a first page of the client application that provides access to a second page. The generated service data can be classified based on the user's access of the pages of the application. The classification of service data enables analysis of user's operation behaviors relative to the same page.

In some implementations, the service data corresponding to one of the application pages, can be categorized based on one or more pre-set variables. The pre-set variable can be defined based on the types of the measured parameters. An example of a pre-set variable can be a variable defining temporal parameters to be measured relative to a portion of one of the application pages or one entire application page. An example of service data acquired based on temporal parameters can include operation behavior at a time point i (a "current operation behavior") and operation behavior at a time point j ("past operation behavior"). A "past operation behavior" associated with access times of a first page can include a record of a beginning date and a time of the first page browsing (for example, 8/30/2017 and 03:01, respectively) and a duration of the browsing behavior in time units (for example, 5 seconds). A "current operation behavior" associated with access times of a first page can include a record of the beginning time and date of the first page browsing (for example, 8/30/2017 and 03:37, respectively) and a duration of the browsing behavior in time units (for example, 3 seconds).

Another example of pre-set variable can be a variable defining financial parameters to be measured relative to a portion of one of the application pages or one entire application page. An example of service data acquired based on financial parameters can include payment behaviors. The payment behaviors can include, for example, payment type, payment date and time, payment day relative to a payment cycle, payment amount, and currency used.

The desktop library can enable a user (for example, an administrator of the client device 202) to select one or more functions or group of functions to be used with the selected application. The browser 220 can enable access to the processing module 212 through a page of the application, such as an internet web page. The processing module 212 can receive a user input to be sent to the application driver 206. The display module 214 can be configured to display or hide one or more processing steps of the service data performed by the application driver 206 and database driver 208. For example, the display module 214 can be configured to display risk results associated with the user input determined by risk identification unit 256. The display module 214 can include one or more applications configured to display charts and graphs. In some implementations, the user interface 204 also includes a local database (not shown) for storing results returned from the application driver 206, and which supports pre-processing, described with reference to FIG. 3.

In the depicted implementation, the application driver 206 includes a gateway 222, a framework 224, a planning module 226, an event module 228, a message bus module 230, an event access module 232, a risk model module 234, a user management module 236, an authorization module 238, and a data dictionary 240. The application driver 206 can be configured to process user inputs, service data and aggregated service data. For example, the application driver 206 hosts an application (for example, a web application) that the client device 202 interacts with through the browser 220 using the gateway 222. More particularly, and in accordance with the present disclosure, the client device 202 interacts with the application driver 206 (and the application) through the user interface 204. The framework 224, the planning module 226, the event module 228, the message bus module 230, the event access module 232, and the risk model module 234 can be configured to process the service data received from the user interface 204 based on parameters set in data dictionary 240 to generate a message to send over the bus to the database driver 208. The user management module 236 and the authorization module 238 are auxiliary modules that enable a user to create and update service risk models and manage data associated with the user. The data dictionary 240 can provide the user 210 definitions of one or more terms and parameters used by the selected application or the modules of the application driver 206. The framework 224 can be configured to transmit the processed service data (for example, aggregated service data) to the database managed by the database driver 208.

The database driver 208 can include planning content 242, a core computing engine 252, a risk identification module 256, an application function library 258, and a predictive analysis library 260. The database driver 208 can be configured to extract service data (for example, time streams) based on processing the data service. The database driver 208 can include functionality that requires retrieving multiple service data streams from the database maintained at the database server based on item references. In accordance with implementations of the present disclosure, the service data streams retrieved by the database are sent to the core computing engine 252, which is configured to aggregate the service data streams before sending the results to the risk identification module 256, as described in detail with reference to FIG. 3.

The planning content 242 can communicate with the core computing engine 252. The core computing engine 252 includes a data processing unit 253, an index parsing unit 254 and an aggregation unit 255. The data processing unit 253 can be used for parsing input service data, and extracting the dimension of service data to be processed based on aggregated index requirements, as described in detail with reference to FIG. 3. The aggregated index parsing unit 254 can be used for parsing service data to extract parameters indicated by the application model provided by the risk model module 234. The parsing parameters can include a data subject, an object, a dimension, and a time window. The parsed service data can be aggregated using one or more functions of the aggregation unit 255. The aggregation unit 255 can be configured to process the parsed service data and compute an approximate value of a statistical feature (a pre-set variable or a dynamically set variable). For example, the aggregation unit 255 can be configured to perform a decay operation, as described in detail with reference to FIG. 3.

The risk identification module 256 can access the core computing engine 252 to retrieve the aggregated service data from the aggregation unit 255. The risk identification module 256 can process the aggregated service data based on a format that matches the application selected through the user interface 204 and one or more parameters included in the risk model indicated by the risk model module 234 to generate a risk score, as described in detail with reference to FIG. 3. The user interface 204 is configured to receive the risk score from the risk identification module 256 and to display it using the display module 214.

Implementations of the present disclosure include the front-end server (including the client device 202 and the user interface 204) and the back-end server (including the application driver 206 and the database driver 208). Because the front end server is modified, implementations of the present disclosure target web application architectures that cleanly separate database service data from other application code and a user interface. The front-end server can be modified when the application is upgraded. For example, an upgrade from an older version of the application to a newer version of the application, can trigger a modification of the front-end server to enable continuous capture of data. The user interface components (for example, images) and design (as well as other resources) can be downloaded as HTML and CSS integrated with the JavaScript code. In order to persistently store and process service data at the client device or on the cloud server, the client issues requests (for example, OData requests), which are processed by a database engine. In some implementations, the requests are translated into queries (for example, SQL queries) for the back-end database. The client device can process the query responses and can display the query responses using dynamically created HTML.

Implementations of the present disclosure are designed to increase the processing speed of service data. In particular, the components of the example architecture 200 have been configured to enable the transmission of multiple service data within a single message that is sent over the bus from the front-end server (for example, user interface 204 of client device) to the back-end server (for example, application driver 206), perform at least a part of data processing (for example, risk identification) at the back-end server (for example, application driver 206) and receive a single response (for example, risk score). In some examples, a portion of the processing operations (for example, parsing) can then be executed by the front-end server (for example, processing module 212) on the response. Using front-end pre-processing, the application programmer can resort to a standard interface.

Figure 3:
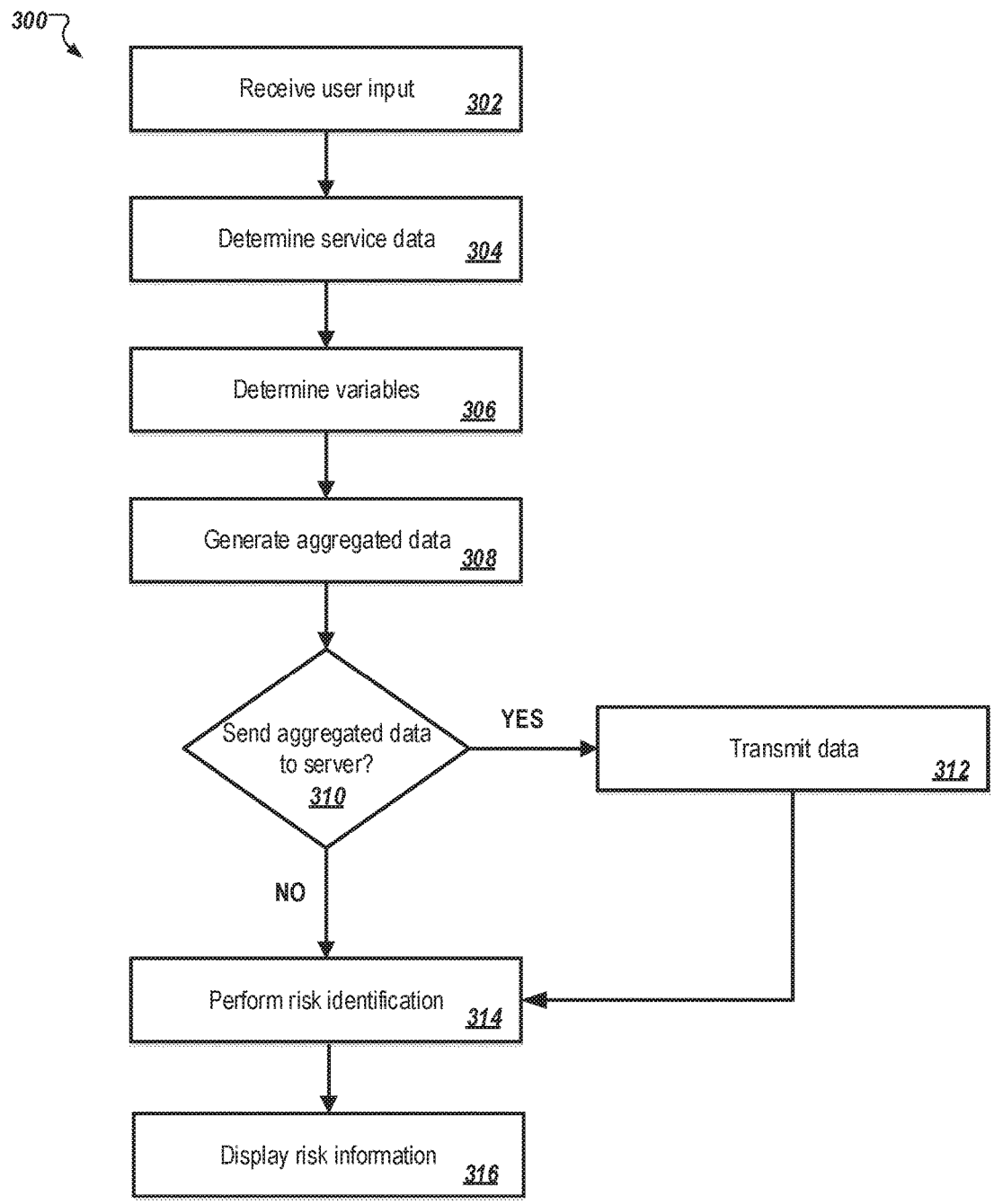
FIG. 3 is a flowchart illustrating an example method for risk identification for service data, according to an implementation of the present disclosure.

FIG. 3 depicts an example method 300 that can be provided as one or more computer-executable programs executed using one or more computing devices, as described with reference to FIGS. 1 and 2. In some implementations, the example method 300 is executed to identify risk of service data using a risk model in accordance with implementations of the present disclosure. In some implementations, various steps of the example method 300 can be run in parallel, in combination, in loops, or in any order.

A user input is received by a client-side computing device (302). The user input can include a plurality of operation behaviors associated with an application, an application page or a portion of an application page. The operation behaviors can include a browsing behavior triggered by a user on a web page, a selection behavior (click) triggered by the user activating a control of a client device, service processing behaviors initiated by the user for different services, or other operations supported by an application, such as a web page. From 302, method 300 proceeds to 304.

Service data is generated by one or more processors of the computing device (304). For example, when the user uses the client device to execute an operation behavior. For example, if the operation behavior is a browsing behavior triggered by the user interacting with a web page, the corresponding generated service data can include address information about the page browsed by the user, the time when the user triggered the browsing behavior, the usage duration of the page, or other parameters describing a user interaction with the web page. If the operation behavior is a service processing behavior initiated by the user for different services (such as, a payment service), the corresponding generated service data can include a target object (for example, a merchant's name), a service time, a service quantitative value (for example, payment amount), or other parameters describing an interaction of the user with the service page.

The service data can be collected using JAVASCRIPT or other languages of an application installed on the client device that is configured to automatically retrieve service data in response to an operation behavior. In some implementations, service data can be categorized based on the types of operation behaviors. Each type of operation behavior can be defined by a rule, such as a logical description of the collected service data. From 304, method 300 proceeds to 306.

Preset variables are determined by one or more processors of the computing device (306). A preset variable (velocity variable) is associated to each rule to correspond to the operation behavior and can be extracted from the service data. The service data can be processed (parsed) using the rule to determine an execution subject, an object, the time of generation, and other pre-set variables associated with the service data.

For example, if the operation behavior includes a browsing behavior of a web page, the pre-set variable includes at least one or more of a duration of the browsing behavior performed by the user within a particular page, and the number of browsing behaviors performed by the user for the particular page within a particular time interval (such as day, week, month or year). If the operation behavior is a payment behavior, the pre-set variable includes a payment amount.

Each pre-set variable includes an eigenvalue, which is a quantitative value associated to a portion of the service data. The eigenvalue of each pre-set variable contained in the service data is retrieved. For example, if the operation behavior is a browsing behavior for a particular web page, the eigenvalue of the pre-set variable (such as, browsing duration) can be expressed in time units (such as, seconds, minutes, hours or days). If the operation behavior is a payment behavior, the eigenvalue of the pre-set variable (such as, payment amount) can be expressed in currency units. In some implementations, the service data used for obtaining the value of a pre-set variable can be deleted after determining the pre-set variable. In some implementations, the client may call the previously described pre-set algorithm to compute and obtain the value of the pre-set variable and store all service data and all pre-set variables. From 306, method 300 proceeds to 308.

Aggregated data are generated by one or more processors of the computing device (308). Generating aggregated data can include processing two or more eigenvalues corresponding to a preset variable using one or more operations. Each eigenvalue can correspond to a completed operation. A result including an eigenvalue corresponding to a pre-set variable can be determined in response to determining that the user completed an operation (for example, another operation initiated by the user).

As an example, a user A can execute a first browsing operation on a page $P_a$ at a time XX. The first generated service data includes time XX, user A, browsing page $P_a$, and a browsing duration having an eigenvalue expressed in time units (5 s). The service data and the eigenvalue corresponding to the variable of the consumed can be recorded in a storage unit. The user A can execute a second browsing operation on the page $P_a$ at a time YY. The second generated service data includes time YY, user A, browsing page $P_a$, and a browsing duration having an eigenvalue expressed in time units (3 s). Within the context example, the first eigenvalue is 5 s and the second eigenvalue is 3 s, and both eigenvalues correspond to browsing duration for the same web page. A pre-set algorithm can use one or more recorded eigenvalues to determine a decay value of the pre-set variable.

A first result including a first eigenvalue of the pre-set variable that corresponds to a first (current) operation behavior and the decay value can be used as an input for the pre-set algorithm, to obtain an aggregated result (a product value of the first result and the decay value) corresponding to the pre-set variable of a subsequent operation behavior (later than the first operation behavior).

The decay value can be obtained using a decay function. The decay value can be updated each time a new operation is completed and a new eigenvalue is recorded. The decay value can be the same or different from one operation to another.

The aggregated result corresponding to a pre-set variable can be obtained using a mathematical operation(s), such as summing, solving the maximum value, solving the number of non-repetitive results (distinct count), solving the average value or other computing methods. For example, an aggregated result based on summing can be expressed as:

$$F(t_n)=F(t_{n-1})*\text{decay}(t_n,t_{n-1})+f(t_n) \qquad (1),$$

where $F(t_n)$ is the aggregated result corresponding to the pre-set variable after the $n^{th}$ operation behavior, $F(t_{n-1})$ is the aggregated result of the pre-set variable after the $(n-1)^{th}$ operation behavior, $t_n$ is time information when the $n^{th}$ operation behavior occurs, $t_{n-1}$ is time information when the $(n-1)^{th}$ operation behavior occurs, $\text{decay}(t_n, t_{n-1})$ is a decay function of the aggregated result corresponding to the pre-set variable after the $(n-1)^{th}$ operation behavior, and $f(t_n)$ is the eigenvalue (result) of the pre-set variable corresponding to the $n^{th}$ operation behavior. For example, $f(t_n)$ represents an incremental value corresponding to the "current operation behavior," wherein if the pre-set variable is a decay duration (decay sum), then $f(t_n)$ is equal to the duration of the "current operation behavior", and if the pre-set variable is the number of decays (decay count), then $f(t_n)$ is equal to 1.

The decay function can use as an input value (independent variable) an interval duration between the moment when the "past operation behavior" occurs and the moment when the "current operation behavior" occurs: $(t_n-t_{n-1})$. According to practical service requirements, the output value of the pre-set algorithm (1) is negatively correlated with the interval duration $(t_n-t_{n-1})$. The inverse correlation indicates that what happened recently is more important than what happened further in the past. The value of $(t_n-t_{n-1})$ represents the weight of the last event. If an event happened long time ago, the weight $(t_n-1)$ is smaller than $(t_n-t_{n-1})$. The older an event is, the smaller its impact is on the current operation behavior.

The greater the interval duration is, the smaller the output value (dependent variable) of the decay function is. The decay function can include but is not limited to: an exponential function (Exp), a logarithmic function (log), a trigonometric function $(1/\tan(x+\pi/4))$, a moving window type function, a polynomial type function, or any other mathematical functions. The decay function may further be defined as: $g((t_n-t_{n-1})/W)$, where $t_n$ is the moment when the "current operation behavior" happens, $t_{n-1}$ is the moment when the "past operation behavior" happens, and W is a statistical window coefficient. When $t_n=t_{n-1}$, the value of the decay function is 1; when $t_n>t_{n-1}$, the value of the decay function is smaller than 1; and when $t_n-t_{n-1}$ approaches infinity, the value of the decay function approaches 0.

Within the context of a browsing behavior, the service data corresponding to the user's operation behavior collected by the client can include a first browsing behavior for the first page (the "past operation behavior"), the time when the browsing behavior happens (for example, 03:01), and the duration of the browsing behavior (for example, 5 seconds), and a second browsing behavior for the first page (the "current operation behavior"), the time when the browsing behavior happens (for example, 03:01:30), and the duration of the browsing behavior (for example, 3 seconds).

The pre-set variable can be processed to determine a decay duration $F(t_n)$ (such as, decay sum) of the user performing the browsing behavior on the first page. The decay duration of the current operation behavior $F(t_n)$ is determined based on the output value of the decay function decay$(t_n, t_{n-1})$ (such as, 0.5), the decay duration of the "past operation behavior" $F(t_{n-1})$, and the duration of the browsing behavior $f(t_n)$ (such as, 3 seconds), according to:

$$F(t_n)=F(t_{n-1})*0.5+3 \quad (2).$$

The aggregated result $F(t_{n-1})$ includes the value of the pre-set variable stored before 03:01. For n=1 (if the user has not run a client application on the client before the "past operation behavior") the pre-set variable can be initialized by setting the value of the $F(t_0)=0$. For n=1, decay duration $F(t_1)$ is equal to the duration of the browsing behavior (for example, 5 seconds).

Considering the example parameter, $F(t_1)=5$, the decay duration $F(t_n)$ of the current behavior can be determined using the value of $F(t_{n-1})$, which in the context example is $F(t_1)$. For example:

$$F(t_n)=5*0.5+3=5.5 \quad (3).$$

For subsequent usage of the same page, every time the user performs a browsing behavior, the client device collects the service data corresponding to the browsing behavior, and generates aggregated service data (such as, the decay duration) using the same mathematical formula, such as Equation (1).

Continuing with the context example, it is assumed that the pre-set variable to be computed at this moment is: the number of decays (decay count) of the user performing the browsing behavior for the same page. Then with regard to the "past operation behavior," it is assumed that the output value of the decay function is equal to 0.3, and the number of decays obtained through computing is that decay count=F$(t_{n-1})*0.3+1$, where $F(t_{n-1})$ refers to the value of the pre-set variable stored before 03:01, and where if the user has not run a client application on the client before the "past operation behavior" then the value of the pre-set variable can be initialized. The decay count=0*0.3+1=1 obtained through computing can be stored. Then, with regard to the "current operation behavior," it is assumed that the output value of the decay function is equal to 0.9, then the number of decays obtained through computing is the decay count=the value of the currently stored decay count*the output value of the decay function+1=1*0.9+1=1.9. In the subsequent usage method, every time the user performs a browsing behavior for the first page, the client can collect and obtain the service data corresponding to the browsing behavior, and performs aggregated computing of the number of decays decay count according to the previously described computing formula.

The "past operation behavior" and the following user operation described herein are two adjacent operation behaviors (such as, browsing behaviors) for the same page. If another browsing behavior for the first page happens at 03:00 before the browsing behavior for the first page happening at 03:01, then the browsing behavior happening at 03:00 can be referred to as the "past operation behavior" and the browsing behavior happening at 03:01 can be referred to as the "current operation behavior."

If the interval between the "past operation behavior" and the "current operation behavior" for browsing the same page is greater than a set numerical value, then the output value of the decay function can approach 0. The decay duration is decay sum the browsing duration of the "current operation behavior", and the number of decays obtained through computing is decay count 1.

The time for applying the previously-described pre-set algorithm to compute the value of the pre-set variable is not limited to a particular interval. Within the context example of a payment behavior, the aggregated result of the payment amount can be determined using a five-day (432000 seconds) time window as a limitation.

For the selected time window, the decay function is:

$$pow(e,-(t_n-t_{n-1})/(k*432000)) \quad (4),$$

where $t_n$ is the time when the current payment behavior happens (computed in seconds) and $t_{n-1}$ is the time when the immediate preceding payment behavior happens.

Table 1 is a schematic table of aggregated results obtained through computing at different times.

TABLE 1

| Payment time | Amount | Last result | Aggregated result SUM (amount) 5-day |
|---|---|---|---|
| t1 = 07/01/2016 15:10:11 | 37.00 | sum = 0, t0 = t1 = 0 | 0 * pow(e, 0) + 37 = SUM1 |
| t2 = 07/02/2016 14:20:17 | 12.00 | sum = 37, t2 − t1 = 83406 | SUM1 * pow(e, −83406/432000) + 12 = SUM2 |
| t3 = 07/04/2016 10:19:51 | 55.00 | sum = SUM2, t3 − t2 = 158374 | SUM2 * pow(e, −158374/432000) + 55 = SUM3 |
| t4 = 07/07/2016 19:23:01 | 90.00 | sum = SUM3, t4 − t3 = 291790 | SUM3 * pow(e, −291790/432000) + 90 = SUM4 |
| t5 = 07/13/2016 17:10:33 | 140.00 | sum = SUM4, t5 − t4 = 510452 | SUM4 * pow(e, −510452/432000) + 140 = SUM5 |
| t6 = 07/19/2016 09:20:25 | 19.00 | sum = SUM5, t6 − t5 = 490192 | SUM5 * pow(e, −291790/432000) + 19 = SUM6 |
| t7 = 07/20/2016 13:55:59 | 23.00 | sum = SUM6, t7 − t6 = 102934 | SUM6 * pow(e, −291790/432000) + 23 = SUM7 |
| t8 = 07/23/2016 03:30:13 | 201.00 | sum = SUM7, t8 − t7 = 221654 | SUM7 * pow(e, −291790/432000) + 201 = SUM8 |

The aggregation algorithm used in Table 1 is:

$$F_n=F_{n-1}*pow(e,-(t_n-t_{n-1})/(k*432000))+T_n \quad (5),$$

$F_{n-1}$ is the first result, k is the decay window coefficient or a constant coefficient, the error resulted from approximate computing can be optimized by adjusting k; and $T_n$ is the first eigenvalue.

The aggregated result based on solving the maximum value can be expressed as:

$$F(t_n)=\text{Max}\{F(t_{n-1})*\text{decay}(t_n,t_{n-1}),f(t_n)\} \quad (6).$$

The aggregated result, based on solving the number of non-repetitive results (distinct count), can be expressed as:

$$F(t_n)*\text{Decay}(t_n,t_{n-1})+1-\text{decay}(t_n-E(t_{last})) \quad (7),$$

where $E(t_{last})$ is the time when the operation behavior is executed most recently.

The aggregated result, based on solving the average value, can be expressed as:

$$F(t_n)=\text{average}\{F(t_{n-1})*\text{Decay}(t_n,t_{n-1}),f(t_n)\} \quad (8).$$

The client device can use a pre-set algorithm to compute and obtain the aggregated result corresponding to the pre-set variable contained in the collected service data. Each time service data generated by the user executing an operation behavior is collected, a pre-set variable corresponding to the current operation behavior is determined to calculate the aggregated result corresponding to the pre-set variable after the current operation.

In some implementations, the aggregated result of the pre-set variable can be obtained through iterative computing. According to iterative computing, a first (or a particular) operation behavior can be used as a starting point. For every subsequent operation behavior, the aggregation method can be triggered for determining an aggregated result. A continuous update of the service data collected by the client device can trigger a continuous change of the aggregated result of the pre-set variable. The computing method of the aggregated result of the pre-set variable can include lightweight computing.

In some implementations, the client may store the collected service data corresponding to operation behaviors of a plurality of users of the same page displayed by a particular application of the client device, and perform the pre-set algorithm periodically or at irregular intervals to compute the aggregated data. It some implementations, the client can delete a portion or all service data and pre-set variables after computing the aggregated data. It some implementations, after the client device computes an aggregated result of the pre-set variable and stores it locally, the aggregated result of the pre-set variable corresponding to the "past operation behavior," which was previously stored locally can be deleted. In this way, the client may implement the storage method for the value of the pre-set variable obtained through computing by means of lightweight storage. An advantage of iterative computing of the decay function, is that not all calculated data can be permanently stored, so that storage overhead and computing overhead of the client does not change with the magnitude of data, which can greatly enhance storage, transmission, and computing capabilities of the client. From 308, method 300 proceeds to 310.

It is determined whether aggregated data is to be sent to the server (310). Selecting whether to send the aggregated result of a pre-set variable to the server can be determined according to a parameter setting of the application of the computing device. In some implementations the parameter setting (such as a flag, or a trigger) can be activated or deactivated by a user of the computing device. Selecting when to send the aggregated result of a pre-set variable to the server can be determined according to a pre-configured trigger mechanism. For example, the aggregated result of the pre-set variable may be continuously computed and stored locally. At particular time intervals or a particular number of operation behaviors, the client device sends the aggregated result of the pre-set variable currently stored to the server. Alternatively, the client device sends the aggregated results to the server in response to identification of a triggering action. For instance, in response to a payment event triggered by the user, the client acquires the aggregated result of the pre-set variable currently stored, and sends the acquired aggregated result of the pre-set variable together with transaction data of the payment event to the server. Aggregated data transmission can include: transmission of a portion of the determined aggregated data in real-time, which can be completed within a relatively short time, thereby reducing the network resource consumption in the data transmission method and transmission of all aggregated data asynchronously reducing processing resources. From 310, method 300 proceeds to 312 or 314.

If a component of the computing device is configured to transmit the aggregated data, the aggregated data is transmitted from the client device to the server for further processing (312). Otherwise, the aggregated data is further processed at the client device. The aggregated data is processed to determine a risk score (314). Determining a risk score includes inputting the aggregated result into a risk model and performing risk identification on the operation behavior of the user according to an output result from the risk model. The server receives the value of the pre-set variable sent by the client and uses it as an input to a risk identification model.

The computed aggregated result of the pre-set variable can be processed by a processor of the client device or the server, utilizing a risk identification model stored at the client device or at the client to perform risk identification. For example, the risk identification model can process the aggregated data to generate a risk information using a risk identification rule. The risk information can include a risk score that indicates a level of risk associated to the operation behavior. The risk score can be a numerical value or a qualitative value (for example, low risk, medium risk and high risk). The risk identification rule can use as input only the aggregated data, providing the advantage of reducing the consumption of computing resources. In some implementations, the risk identification rule can include comparing the aggregated data to a pre-set threshold to determine the risk score. As an example, the pre-set threshold can depend on the type of operation behavior, the mathematical function used to determine the aggregated data, a time interval from the first operation, or other parameters. In some implementations, the risk identification model can include a risk prevention and control by applying a corresponding risk prevention rule. From 314, method 300 proceeds to 316.

The risk information is displayed (316). The risk information can be displayed as charts or graphs. In response to determining a high risk, an alert can be issued. In some implementations, the alert can trigger one or more post-processing operations to identify client device functions associated with the risk that triggered the alert. In some implementations, the post-processing operations can include removing the risk (blocking a behavior) associated with the high risk and displaying a message associated with the risk. For example, if browsing an unsecure site is identified as a high risk, access to the particular site is blocked. After 316, method 300 stops.

Figure 4:
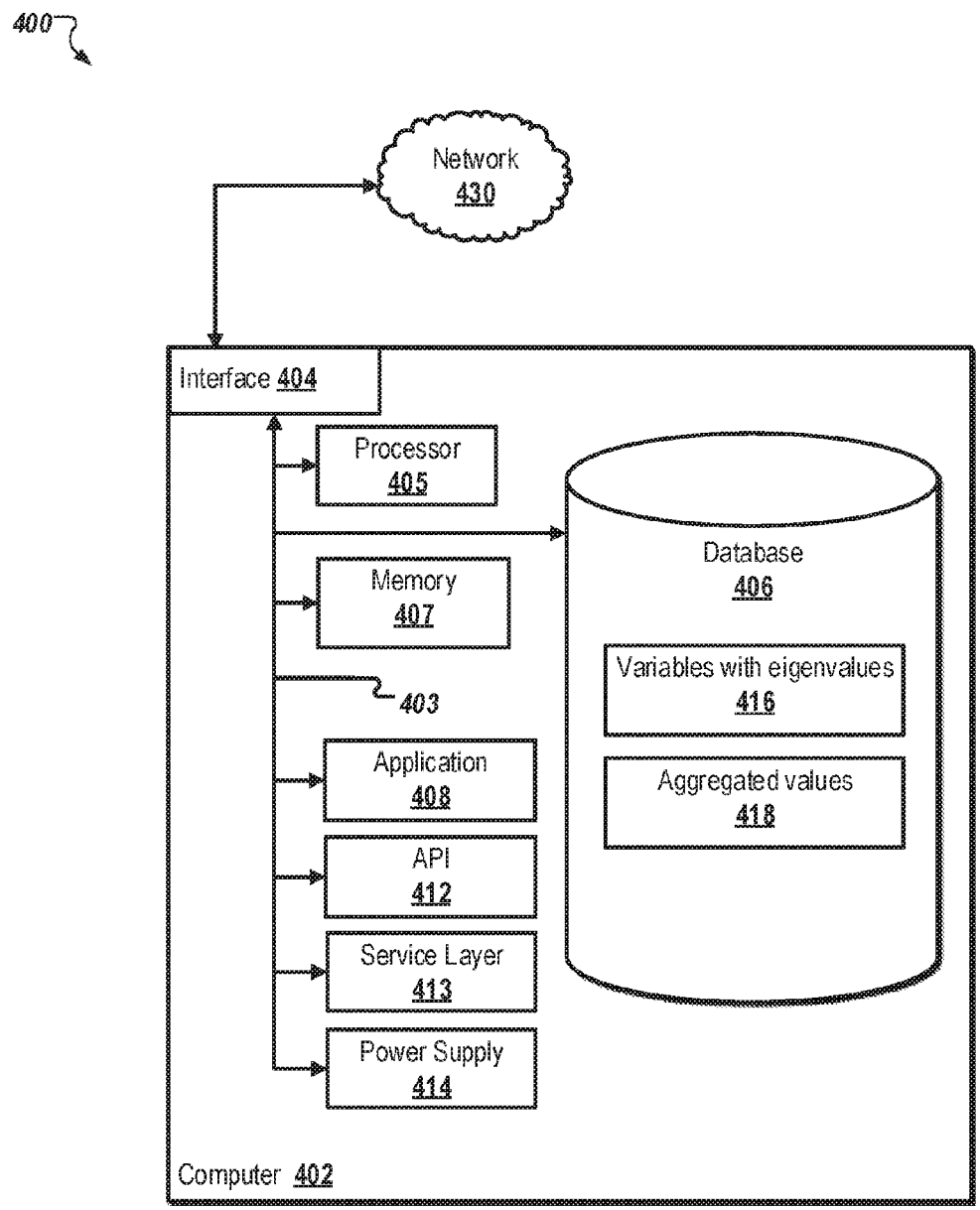
FIG. 4 is a block diagram illustrating an example computer system used to provide computational functionalities associated with described algorithms, methods, functions, processes, flows, and procedures as described in the instant disclosure, according to an implementation of the present disclosure.

FIG. 4 is a block diagram of an example computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

At a high level, the computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users (for example, from a command console or by another internal access method), external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds previously described variables with eigenvalues 416 and aggregated data 418.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Described implementations of the subject matter can include one or more features, alone or in combination.

For example, in a first implementation, a computer-implemented method for risk identification of service data includes the operations of determining, by a client-side computing device, a first service data corresponding to a first operation behavior associated with a user input on the client-side computing device, determining, by the client-side computing device, a first variable corresponding to the first service data, the first variable including a first eigenvalue, retrieving, by the client-side computing device, a second eigenvalue corresponding to a second operation behavior that was performed at a second time before the first operation behavior, generating, by the client-side computing device, a decay value by processing the first time and the second time a decay function, generating, by the client-side computing device, an aggregated data by processing the first variable, the second eigenvalue, and the decay value using an aggregation function, and determining, by the one or more processors, a risk associated with the first operation by processing the aggregated data using a risk identification model.

The foregoing and other described implementations can each, optionally, include one or more of the following features:

A first feature, combinable with any of the following features, includes, in response to generating the aggregated data, deleting the second eigenvalue.

In a second feature, combinable with any of the previous or following features, the one or more processors are integrated in a server-side computing device.

A third feature, combinable with any of the previous or following features, includes transmitting the aggregated data from the client-side computing device to the server-side computing device.

In a fourth feature, combinable with any of the previous or following features, the aggregation function includes a mathematical operation defining at least one of a summing operation, an identification of a maximum value, and an identification of non-repetitive results.

In a fifth feature, combinable with any of the previous or following features, the decay function includes a mathematical operation defining at least one of an exponential function, a logarithmic function, a trigonometric function, a moving window type function, and a polynomial type function.

A sixth feature, combinable with any of the previous or following features, includes displaying the risk associated with the first operation to a user of the client-side computing device.

In a second implementation, a non-transitory, computer-readable medium storing one or more instructions executable by a computer system to perform operations including determining, by a client-side computing device, a first service data corresponding to a first operation behavior associated with a user input on the client-side computing device, determining, by the client-side computing device, a first variable corresponding to the first service data, the first variable including a first eigenvalue, retrieving, by the client-side computing device, a second eigenvalue corresponding to a second operation behavior that was performed at a second time before the first operation behavior, generating, by the client-side computing device, a decay value by processing the first time and the second time a decay function, generating, by the client-side computing device, an aggregated data by processing the first variable, the second eigenvalue, and the decay value using an aggregation function, and determining, by the one or more processors, a risk associated with the first operation by processing the aggregated data using a risk identification model.

The foregoing and other described implementations can each, optionally, include one or more of the following features:

A first feature, combinable with any of the following features, includes, in response to generating the aggregated data, deleting the second eigenvalue.

In a second feature, combinable with any of the previous or following features, the one or more processors are integrated in a server-side computing device.

A third feature, combinable with any of the previous or following features, includes transmitting the aggregated data from the client-side computing device to the server-side computing device.

In a fourth feature, combinable with any of the previous or following features, the aggregation function includes a mathematical operation defining at least one of a summing operation, an identification of a maximum value, and an identification of non-repetitive results.

In a fifth feature, combinable with any of the previous or following features, the decay function includes a mathematical operation defining at least one of an exponential function, a logarithmic function, a trigonometric function, a moving window type function, and a polynomial type function.

A sixth feature, combinable with any of the previous or following features, includes displaying the risk associated with the first operation to a user of the client-side computing device.

In a third implementation, a computer-implemented system, includes one or more computers and one or more computer memory devices interoperably coupled with the one or more computers and having tangible, non-transitory, machine-readable media storing instructions, that when executed by the one or more computers, perform operations including determining, by a client-side computing device, a first service data corresponding to a first operation behavior associated with a user input on the client-side computing device, determining, by the client-side computing device, a first variable corresponding to the first service data, the first variable including a first eigenvalue, retrieving, by the client-side computing device, a second eigenvalue corresponding to a second operation behavior that was performed at a second time before the first operation behavior, generating, by the client-side computing device, a decay value by processing the first time and the second time a decay function, generating, by the client-side computing device, an aggregated data by processing the first variable, the second eigenvalue, and the decay value using an aggregation function, and determining, by the one or more processors, a risk associated with the first operation by processing the aggregated data using a risk identification model.

The foregoing and other described implementations can each, optionally, include one or more of the following features:

A first feature, combinable with any of the following features, includes, in response to generating the aggregated data, deleting the second eigenvalue.

In a second feature, combinable with any of the previous or following features, the one or more processors are integrated in a server-side computing device.

A third feature, combinable with any of the previous or following features, includes transmitting the aggregated data from the client-side computing device to the server-side computing device.

In a fourth feature, combinable with any of the previous or following features, the aggregation function includes a mathematical operation defining at least one of a summing operation, an identification of a maximum value, and an identification of non-repetitive results.

In a fifth feature, combinable with any of the previous or following features, the decay function includes a mathematical operation defining at least one of an exponential function, a logarithmic function, a trigonometric function, a moving window type function, and a polynomial type function.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or another unit for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures may be illustrated as individual modules that implement described features and functionality using various objects, methods, or other processes, the programs can instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/-R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a device that is used by the user (for example, by sending web pages to a web browser on a user's client device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for risk identification of service data, the method being executed by one or more processors and comprising:
   determining, by a client-side computing device, a first service data corresponding to a first operation behavior associated with a user input on the client-side computing device;
   determining, by the client-side computing device, a first variable corresponding to the first service data, the first variable comprising a first eigenvalue;
   retrieving, by the client-side computing device, a second eigenvalue corresponding to a second operation behavior that was performed at a second time before the first operation behavior;
   generating, by the client-side computing device, a decay value by processing the first time and the second time using a decay function, the decay value being weighted based upon the second time;
   generating, by the client-side computing device, an aggregated data by processing the first variable, the second eigenvalue, and the decay value using an aggregation function; and
   determining, by the one or more processors, a risk associated with the first operation by processing the aggregated data using a risk identification model.

2. The method of claim 1, further comprising, in response to generating the aggregated data, deleting the second eigenvalue.

3. The method of claim 1, wherein the one or more processors are integrated in a server-side computing device.

4. The method of claim 3, further comprising transmitting the aggregated data from the client-side computing device to the server-side computing device.

5. The method of claim 4, wherein the aggregation function comprises a mathematical operation defining at least one of a summing operation, an identification of a maximum value, and an identification of non-repetitive results.

6. The method of claim 1, wherein the decay function comprises a mathematical operation defining at least one of an exponential function, a logarithmic function, a trigonometric function, a moving window type function, and a polynomial type function.

7. The method of claim 1, further comprising displaying the risk associated with the first operation to a user of the client-side computing device.

8. A non-transitory, computer-readable medium storing one or more instructions executable by a computer system to perform operations comprising:
   determining, by a client-side computing device, a first service data corresponding to a first operation behavior associated with a user input on the client-side computing device;
   determining, by the client-side computing device, a first variable corresponding to the first service data, the first variable comprising a first eigenvalue;
   retrieving, by the client-side computing device, a second eigenvalue corresponding to a second operation behavior that was performed at a second time before the first operation behavior;
   generating, by the client-side computing device, a decay value by processing the first time and the second time using a decay function, the decay value being weighted based upon the second time;
   generating, by the client-side computing device, an aggregated data by processing the first variable, the second eigenvalue, and the decay value using an aggregation function; and
   determining, by the one or more processors, a risk associated with the first operation by processing the aggregated data using a risk identification model.

9. The non-transitory, computer-readable medium of claim 8, further comprising, in response to generating the aggregated data, deleting the second eigenvalue.

10. The non-transitory, computer-readable medium of claim 8, wherein the one or more processors are integrated in a server-side computing device.

11. The method of claim 10, further comprising transmitting the aggregated data from the client-side computing device to the server-side computing device.

12. The non-transitory, computer-readable medium of claim 11, wherein the aggregation function comprises a mathematical operation defining at least one of a summing operation, an identification of a maximum value, and an identification of non-repetitive results.

13. The non-transitory, computer-readable medium of claim 8, wherein the decay function comprises a mathematical operation defining at least one of an exponential function, a logarithmic function, a trigonometric function, a moving window type function, and a polynomial type function.

14. The non-transitory, computer-readable medium of claim 8, further comprising displaying the risk associated with the first operation to a user of the client-side computing device.

15. A computer-implemented system, comprising:
one or more computers; and
one or more computer memory devices interoperably coupled with the one or more computers and having tangible, non-transitory, machine-readable media storing instructions that, when executed by the one or more computers, perform operations comprising:
determining, by a client-side computing device, a first service data corresponding to a first operation behavior associated with a user input on the client-side computing device;
determining, by the client-side computing device, a first variable corresponding to the first service data, the first variable comprising a first eigenvalue;
retrieving, by the client-side computing device, a second eigenvalue corresponding to a second operation behavior that was performed at a second time before the first operation behavior;
generating, by the client-side computing device, a decay value by processing the first time and the second time using a decay function, the decay value being weighted based upon the second time;
generating, by the client-side computing device, an aggregated data by processing the first variable, the second eigenvalue, and the decay value using an aggregation function; and
determining, by the one or more processors, a risk associated with the first operation by processing the aggregated data using a risk identification model.

16. The computer-implemented system of claim 15, further comprising, in response to generating the aggregated data, deleting the second eigenvalue.

17. The computer-implemented system of claim 15, wherein the one or more processors are integrated in a server-side computing device.

18. The computer-implemented system of claim 17, further comprising transmitting the aggregated data from the client-side computing device to the server-side computing device.

19. The method of claim 18, wherein the aggregation function comprises a mathematical operation defining at least one of a summing operation, an identification of a maximum value, and an identification of non-repetitive results.

20. The computer-implemented system of claim 19, wherein the decay function comprises a mathematical operation defining at least one of an exponential function, a logarithmic function, a trigonometric function, a moving window type function, and a polynomial type function.

* * * * *